(No Model.)
I. MORGAN.
FLOUR REFINER.
No. 299,245. Patented May 27, 1884.
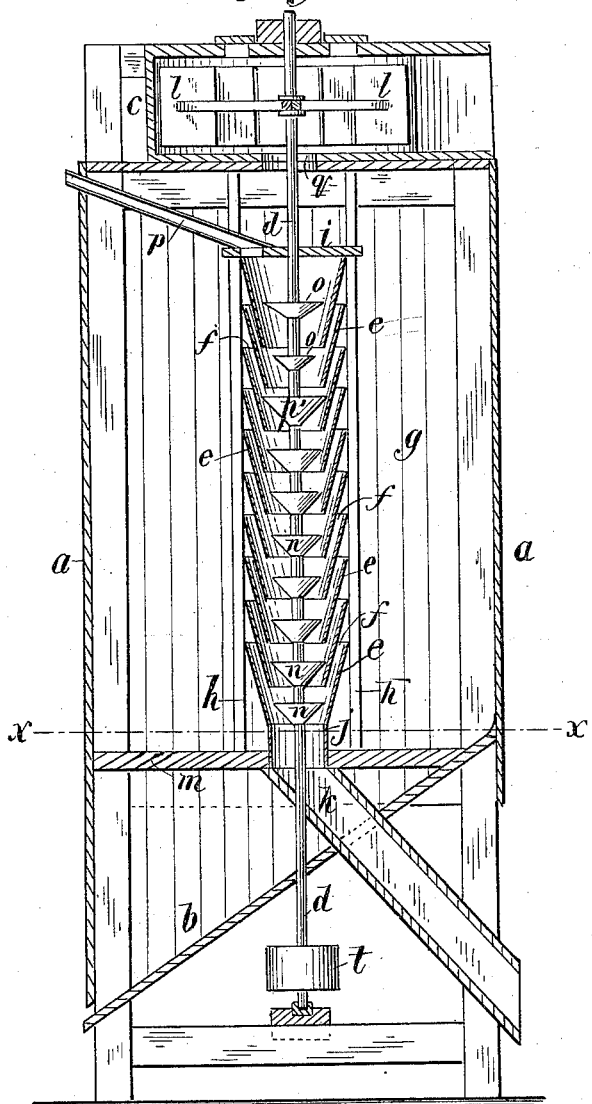
WITNESSES:
J. D. Garfield
C. Sedgwick
INVENTOR:
I. Morgan
BY Munn & Co.
ATTORNEYS.

UNITED STATES PATENT OFFICE.

ISAAC MORGAN, OF ST. LOUIS, MISSOURI, ASSIGNOR OF ONE-FOURTH TO CAROL H. COGGESHALL, OF SAME PLACE.

FLOUR-REFINER.

SPECIFICATION forming part of Letters Patent No. 299,245, dated May 27, 1884.

Application filed October 4, 1882. Renewed January 26, 1884. (No model.)

*To all whom it may concern:*

Be it known that I, ISAAC MORGAN, of St. Louis, State of Missouri, have invented a new and Improved Flour-Refiner, of which the following is a full, clear, and exact description.

Reference is to be had to the accompanying drawings, forming part of this specification, in which the same letters of reference indicate the same or corresponding parts in both the figures.

Figure 1 is a sectional elevation of my improved flour-refiner, and Fig. 2 is a horizontal section on the line $x\ x$ of Fig. 1.

Within a suitable vertical case, $a$, having a hopper-bottom, $b$, at the lower end, and a fan-case, $c$, at the upper end, I arrange a vertical shaft, $d$, along the center, within a series of funnels, $e$, arranged in a vertical column and entering one within another, but providing annular spaces $f$ between them, affording issues for the light matters contained in the flour to escape with the air-currents into the space $g$ within the case $a$, said funnels being supported on the rods $h$ or by other suitable means, the upper one being closed at the top by a cover, $i$, and the lower one, $j$, being connected by its lower end with the top of a spout $k$, through which the air enters by the suction of the fan $l$, and the refined flour escapes from the machine. Along this shaft, within the funnels $e$, is a series of cup-shaped centrifugal distributers, $n$, a feeder, $p'$, and a couple of agitators or enliveners, $o$, attached to and revolving with the shaft, the feeder being larger than the lower end of the funnel under which it works, to serve together with it as a regulator of the feed of the flour, which is previously stirred and enlivened by the smaller cups above. The flour is fed in through the top $i$ of the upper funnel $e$ by the spout $p$, and as it is enlivened, fed, and distributed down along the same the air is drawn up through the flour by the suction of fan $l$, which separates all prejudicial substances, impurities, and fermental matters that may be contained in it by lifting them up through passages $f$, when said matters fall into the hopper $b$ to pass away into any receptacle, while the air escapes through the passage $q$ into the fan, and thence out through its case, and the refined flour passes away through the spout $k$. The distributers and the fan are attached directly to the shaft $d$, to be rotated by it, and it is to be operated by a belt working on the pulley $t$, the cross bar or beam $m$, fixed in the case, affording support to funnel $j$ and spout $k$, as represented in the drawings.

Having thus fully described my invention, I claim as new and desire to secure by Letters Patent—

1. The combination of the casing $a$, rotary shaft $d$, suction-fan and chamber $c\ l$, distributers $n\ o$, feed-pipe $p$, and funnels $e$, the uppermost of said funnels having a closed top, as described.

2. In a flour-refiner, the combination of a fan, a feed-spout, a vertical row of funnels, and a cover, $i$, arranged over the top funnel, and the latter communicating by an aperture at one side of the cover with the feed-spout, as shown and described.

3. In a flour-refiner, the combination of a fan, a succession of vertically-arranged funnels, a central revolving shaft, a series of agitators, and a conical feeder, $p'$, arranged on said shaft at a point below one or more of the agitators $o$, and made larger in diameter at its upper end than the lower end of the funnel which surrounds it, as shown and described.

ISAAC MORGAN.

Witnesses:
HECTOR NEUHOFF,
C. H. COGGESHALL.